Patented Sept. 21, 1943

2,330,100

UNITED STATES PATENT OFFICE 2,330,100

PREPARATION OF BITUMINOUS COMPOSITIONS

Harold George Williams, Morden, England, assignor, by mesne assignments, to Standard Catalytic Company, a corporation of Delaware No Drawing. Application April 12, 1940, Serial No. 329,300. In Great Britain May 13, 1939

4 Claims. (Cl. 252—311.5)

This invention relates to improvements in the preparation of bitumen, asphalt, or tar emulsions of the oil-in-water type.

Emulsions prepared by emulsifying asphalts, bitumens or tars in aqueous solutions of alkali together with various stabilizing agents, such as alkali soaps, for example, alkali oleates and naphthenates, Swedish liquid rosin soap or the substances known under the trade name "Vinsol" soaps which are the soaps of the gasoline insoluble portion of rosin have been largely used for the preparation of road and like surfaces, and the expression "bitumen emulsions" used in this specification is intended to include all such emulsions made from bitumens, asphalts and tars.

The application of such emulsions to certain types of stones, for example, siliceous stones such as flints, quartzite or granite, does not always produce a satisfactory surface, as the bitumen, asphalt or tar coating on the stones may separate off fairly quickly under the action of water, as, for example, in wet weather the bond between the bitumen and the stones may be weakened considerably.

Objects of this invention are to improve both the adhesion of the bitumen, asphalt or tar to such stone surfaces and the water-resistant character of such coatings.

It has now been found that the adhesion of bitumen deposited from an alkaline bitumen-in-water emulsion to stone surfaces is improved by incorporating in the emulsion a compound containing in its cation or anion one of the elements of the group comprising aluminium, tin, boron, chromium, zinc, molybdenum and vanadium.

It has also been found that the addition of these compounds to the emulsions has the disadvantage that the resistance of the emulsion to breakdown against the aggregate to which it is applied in use is increased, which results in the difficulty that in practice the bitumen coating is not formed readily when the emulsion is applied to the road or other surface being treated.

It has now been found that this increase in resistance to breakdown can be counteracted by preparing the emulsions containing the adhesion increasing compounds with the use of less alkali and/or less stabilizing agent than are used in the preparation of similar emulsions normally employed for this purpose—that is, that in preparing these emulsions containing the adhesion increasing compounds, the quantity of alkali employed may be reduced or eliminated entirely and the quantity of stabilizing agent such as soap, may also be reduced considerably.

By this means, it has been found that emulsions containing the adhesion increasing compounds, can be prepared which will have a resistance to breakdown in use comparable to that of the emulsions normally used for the same purpose.

The invention accordingly consists in a method of preparing bitumen, asphalt or tar emulsions of the oil-in-water type emulsified with alkali and/or a stabilizing agent wherein the adhesion of the bitumen to the stone surfaces to which the emulsion is applied is increased by incorporating in the emulsion a compound containing an element of the group comprising aluminium, tin, zinc, chromium, boron, molybdenum and vanadium, and the increase in resistance of the emulsion to breakdown on application to the stone surfaces is counteracted by employing less alkali and/or stabilizing agent in the preparation of the emulsion than is employed in the preparation of normal emulsions used for the same purpose.

In carrying out the invention, the amount of reduction in the quantity of the alkali and/or stabilizing agents should be such that it counterbalances the increase in resistance to breakdown produced by the addition of the adhesion increasing compounds and yields a final emulsion having a resistance to breakdown in use substantially equal to that of normal emulsions, i. e., without the addition of the adhesion increasing compounds, employed for the same purpose.

It is also found that the greater the quantity of the adhesion increasing compound such as sodium aluminate that is added, the less can be the quantity of alkali and/or soap; and the best emulsions for any given percentage of bitumen adhesion increasing compound e. g. sodium aluminate, are found to be those containing no free alkali or the minimum quantity of alkali required to give a satisfactory emulsion and such a small percentage of stabilizing agent e. g. soap, as will give a breakdown time comparable to that of the normal emulsions used for the same purpose.

It has been found that the best results are obtained if no free caustic alkali is present in the emulsions, but in this case the bitumen adhesion increasing compounds must be added to the aqueous phase during the preparation of the emulsion, since otherwise it is not possible to prepare emulsions without the use of free alkali.

It is, however, not always possible to prepare emulsions containing no free alkali even with the addition of the bitumen adhesion increasing compounds and in such cases it is necessary to use the minimum quantity of alkali to give a satisfactory emulsion.

It has also been found that it is not possible to prepare satisfactory emulsions containing very small proportions of free alkali such as, for example, less than 0.02%, without the addition of bitumen adhesion increasing compounds during the preparation of the emulsions, and therefore, when producing emulsions according to this invention containing such small quantities as, for example, less than 0.02% which will not yield satisfactory emulsions, it is also necessary to add the bitumen adhesion increasing compounds to the aqueous phase during the process of the manufacture of the emulsion.

It is, however, preferred in all cases, to add the bitumen adhesion increasing compounds to the emulsion during the preparation but in such cases where emulsions can be produced without them, they may be added to the finished emulsion.

The compounds employed should be soluble in one of the phases of the emulsion and it is preferred to use their water soluble compounds containing the element in the anion, for example, the compounds such as sodium aluminate, and sodium stannate called alkali metallates, prepared by dissolving the oxide or carbonate of an element or the element itself in an aqueous solution of an alkali.

However, soaps of the elements with high molecular weight organic acids, such as soaps of resinic acids from colophony, oleic acid, naphthenic acids and the like, which soaps are soluble in the oil or bitumen phase of the emulsion, may also be used if they are added to the bitumen phase.

It is preferred to use the compounds soluble in the aqueous phase, as in general these are more effective than the oil-soluble compounds.

The compound per se may be added to the emulsions or the ingredients used in preparing the emulsions, or they may be produced in situ by the reaction between a compound, e. g. an oxide, hydroxide, carbonate or water soluble salt of the element in question and a compound contained in or added to the emulsion or an ingredient thereof; for example, sodium aluminate, may be prepared by the double decomposition between a water soluble aluminium salt and the alkali hydroxide naturally present in or added to the aqueous phase of the emulsion.

The amount of the compound added may vary over a wide range, and in general it has been found that with the granites the best results are obtained with the addition of quantities yielding an emulsion containing about 0.03 per cent of the metal in the case of tin compounds, and 0.04 to 0.06 per cent of the metal in the case of aluminium compounds. Higher amounts are required to give the best results with flints, e. g. 0.10% aluminium, although good results may be obtained using larger or smaller quantities than these, and quantities up to 0.5 per cent of tin and 0.2 per cent of aluminium or more, have produced satisfactory results.

It has been found that with emulsions prepared in this manner, satisfactory coatings may be obtained even with wet siliceous aggregates which are known to be difficult to coat in the normal way and do not yield satisfactory coatings with straight bitumens, bitumen-in-oil mixtures or cutbacks.

The invention will now be illustrated by way of example only in the following examples, in which examples 1 to 8, which are given for purposes of comparison with the subject of the invention, illustrate the increase in the adhesion of the bitumen to stone produced by adding these compounds to normal emulsions and Examples 9 to 12, which describe forms of the present invention, illustrate the increase in resistance to breakdown of the emulsion produced by addition of the compounds and the reduction in this increase in resistance to breakdown produced by reducing the amount of alkali and/or stabilizing agent used in preparing the emulsions.

A standard emulsion of the oil-in-water type was prepared for comparison containing about 55 per cent bitumen and 0.05 per cent excess of sodium hydroxide and 0.5 per cent of rosin soap, by mixing a stream of Venezuelan asphalt of 200/220 penetration, heated to a temperature of about 110° C., with a stream of water containing the alkali and soap, heated to a temperature of about 80° C., and passing the mixture through a colloid mill in known manner. The emulsion was then allowed to stand and cool for 24 hours, after which the bitumen content was estimated and if greatly above 55 per cent, was adjusted to this concentration by the addition of distilled water.

This emulsion was then used as the standard emulsion in the following tests.

The stones employed for the tests were of a general size from ¼ inch to ½ inch and were dried in the laboratory at room temperature and were freed as far as possible from dust by blowing with a blast of air.

Experiments were carried out on dry stones prepared as above and on wet stones, which were the dried stones drenched with 2 per cent of their weight of water.

150 gms. of the stones were placed in a stoppered bottle of a size just sufficient to hold them comfortably, and slightly more than the minimum amount (11 gm.) of the emulsion required to coat the stones was added. The stones were then shaken until coated and allowed to drain on an 8-mesh sieve for three minutes.

The coated stones were then spread in a single layer on a glass plate and allowed to stand or "cure" for either 4 or 24 hours at a constant humidity of about 77 per cent. After curing, the stones were then transferred to 1 lb. cans fitted with water-tight lids and covered with water at 75–77° F. and placed endwise in the box of a shaking machine of the reciprocal type arranged to move the box over a horizontal path 6 inches long, 150 times in each direction per minute.

The shaking was continued for one minute after which the can was removed and the water poured off, and the percentage of stone not covered with bitumen was estimated by visual examination.

The can was again filled with water and the shaking continued.

The process of interruption of shaking, pouring off the water, examination of the stones and refilling with water and further shaking, was repeated after the following total times: 1, 2, 3, 4, 5, 7, 10, 15, 20, 25, 30, 45, 60, 90 and 120 minutes, and thence hourly until 50 per cent of the stone was uncovered as measured by visual examination. The time of shaking required to produce this 50 per cent uncovering of the stone, measured directly as above, or in the case of times less than one minute, estimated from the proportion uncovered after one minute's shaking, was adopted as an arbitrary measurement of the adhesion of the bitumen to the stone for the purposes of comparison.

Each experiment was repeated in quadruplicate and the average value of the four values was used.

Using the standard emulsion prepared as above and Mountsorrel granite chippings as the stones, the following results were obtained as an average of a large number of experiments:

| Time of curing | Dry stones | | Wet stones | |
|---|---|---|---|---|
| | 4 hrs. | 24 hrs. | 4 hrs. | 24 hrs. |
| Minutes shaking to 50% removal | 0.2 | 0.8 | 0.1 | 0.7 |

Example 1

An emulsion was prepared similarly to the standard emulsion described above but with the addition to the aqueous phase of 0.05 per cent by weight of $SnCl_2.2H_2O$, and then 0.085 per cent by weight of caustic soda to leave an excess of 0.05 per cent by weight of caustic soda in the finished emulsion, all weights being calculated on the weight of the final emulsion.

The tin compound was dissolved in a small portion of the aqueous liquid with the aid of gentle heat and the solution was added to the main bulk of the liquid. The soap was then added to the aqueous liquid and the emulsion was made up as described above.

This emulsion was then tested in the manner described above on Mountsorrel granite chippings, both wet and dry, with the following results:

| Time of curing | Dry stones | | Wet stones | |
|---|---|---|---|---|
| | 4 hrs. | 24 hrs. | 4 hrs. | 24 hrs. |
| Minutes shaking to 50% removal | 4 | 45 | 1 | 45 |
| Relative improvement in adhesion over standard emulsion | 20 | 56 | 10 | 64 |

Example 2

The emulsion was prepared similarly to the standard emulsion with the exception that 0.12% by weight of sodium aluminate ($NaAlO_2$) calculated on the weight of the finished emulsion was dissolved in the aqueous phase containing the 0.05% excess caustic soda before the addition of the soap.

The emulsion was then coated upon Mountsorrel granite chippings and tested as described above with the following results:

| Time of curing | Dry stones | | Wet stones | |
|---|---|---|---|---|
| | 4 hrs. | 24 hrs. | 4 hrs. | 24 hrs. |
| Minutes shaking to 50% removal | 10 | 30 | 2 | 30 |
| Relative improvement in adhesion over standard emulsion | 50 | 37 | 20 | 43 |

Example 3

An emulsion was prepared similarly to the standard emulsion described above with the exception that 0.15% by weight of tin resinate based upon the weight of the final emulsion, was dissolved in the bitumen phase before mixing.

The emulsion was then coated on Mountsorrel granite chippings and tested by the method described, with the following results:

| Time of curing | Dry stones | | Wet stones | |
|---|---|---|---|---|
| | 4 hrs. | 24 hrs. | 4 hrs. | 24 hrs. |
| Minutes shaking to 50% removal | 1.0 | 25 | 0.7 | 25 |
| Relative improvement in adhesion over standard emulsion | 5 | 31 | 7 | 36 |

Example 4

An emulsion was prepared similarly to the standard emulsion described above. To it was added with vigorous stirring a concentrated solution containing 0.05% $SnCl_2.2H_2O$ (stannous chloride) and 0.06% of sodium hydroxide, based on the weight of the emulsion.

The resulting emulsion was then coated on Mountsorrel granite chippings and tested by the method described, with the following results:

| Time of curing | Dry stones | | Wet stones | |
|---|---|---|---|---|
| | 4 hrs. | 24 hrs. | 4 hrs. | 24 hrs. |
| Minutes shaking to 50% removal | 5 | 40 | 3 | 30 |
| Relative improvement in adhesion over standard emulsion | 25 | 50 | 30 | 43 |

Example 5

An emulsion was prepared from a sample of refined coal tar of B. R. T. A. viscosity 80 seconds at 30° C., in a similar manner to the standard bitumen emulsion described, but with the addition of 2% of Wecker still bottoms (fatty acids of high molecular weight) to the tar, and an increase of the caustic soda to 0.1% to obtain a satisfactory emulsion.

Using this emulsion and Mountsorrel granite chippings as the stones, the following results were obtained:

| Time of curing | Dry stones | | Wet stones | |
|---|---|---|---|---|
| | 4 hrs. | 24 hrs. | 4 hrs. | 24 hrs. |
| Minutes shaking to 50% removal | 0.1 | 0.75 | 0.1 | 0.45 |

Example 6

An emulsion was prepared similarly to the emulsion described in Example 5, but with the addition to the aqueous phase of 0.3% by weight of hydrated aluminium sulphate containing 32.5% of water, and then 0.27% sodium hydroxide to leave an excess of 0.1% in the finished emulsion, all weights being calculated on the final weight of the finished emulsion.

This emulsion was then coated on Mountsorrel granite chippings, wet and dry, and tested by the same methods as with the bitumen emulsions described above, with the following results:

| Time of curing | Dry stones | | Wet stones | |
|---|---|---|---|---|
| | 4 hrs. | 24 hrs. | 4 hrs. | 24 hrs. |
| Minutes shaking to 50% removal | 165 | 240 | 150 | 240 |
| Relative improvement in adhesion over that of emulsion in Example 5 | 1,650 | 320 | 1,500 | 530 |

Example 7

An emulsion was prepared similarly to the standard emulsion described above with the exception that 0.2% by weight of borax was dissolved in the aqueous phase containing 0.05% excess caustic soda before emulsifying. This emulsion was then coated upon Mountsorrel granite chippings and tested for adhesion of the bitumen by the method described above with the following results:

| Time of curing | Dry stones | | Wet stones | |
|---|---|---|---|---|
| | 4 hrs. | 24 hrs. | 4 hrs. | 24 hrs. |
| Minutes shaking to 50% removal | 0.8 | 10 | 0.4 | 10 |
| Relative improvement in adhesion over standard emulsion | 4 | 13 | 4 | 14 |

*Example 8*

An emulsion was prepared similarly to the standard emulsion described above with the exception that 0.2% by weight of potassium chromate was dissolved in the aqueous phase before emulsifying. The emulsion was then coated upon Mountsorrel granite chippings and tested for adhesion of the bitumen by the method described above with the following results:

| Time of curing | Dry stones | | Wet stones | |
|---|---|---|---|---|
| | 4 hrs. | 24 hrs. | 4 hrs. | 24 hrs. |
| Minutes shaking to 50% removal | 0.4 | 7 | 0.2 | 7 |
| Relative improvement in adhesion over standard emilsion | 2 | 9 | 2 | 10 |

*Example 9*

The standard emulsion of the oil-in-water type containing about 55% of bitumen and 0.05% excess sodium hydroxide with 0.5% rosin soap was prepared as hereinbefore described.

A similar emulsion was prepared in the same manner but containing 0.2% of sodium aluminate added to the aqueous phase and a further series of emulsions were also prepared in a similar manner, each containing 0.2% of sodium aluminate added in the aqueous phase but containing varying amounts of alkali and/or rosin soap. In all cases the rosin soap used was Swedish liquid rosin soap (hereinafter referred to as S. L. R. soap).

The emulsions were then tested to find their resistance to breakdown against sand by the following method:

50 gms. of cement testing sand of about 10 mesh was weighed into a 250 ml. beaker, and 10 ml. of emulsion were added to the mixture which was stirred at the rate of one stir per second until the emulsion had broken down as shown by visual examination. The time for this to occur from the addition of the emulsion which is taken as the measure of resistance to breakdown, was measured to the nearest quarter minute up to five minutes and to the nearest half minute for longer times. In some cases the breakdown was not sharp and several attempts to find the endpoint were made, the time of stirring being increased by half a minute in each successive test. At the conclusion the mixture was rinsed with distilled water until the rinsing water removed only a small quantity of emulsion and at the completion of this, the percentage of sand covered by the asphalt was estimated visually as an indication of the covering power of the emulsion after breaking.

The sand employed should be from the same batch for each series of tests as it has been found that different results are obtained with sands from different sources so that it is necessary for comparative results to use a standard sand for the whole series of tests.

The results obtained are tabulated as follows:

| Emulsion | Amount of sodium aluminate | Amount of alkali | Amount of S. L. R. soap | Breakdown time in minutes | Sand covered |
|---|---|---|---|---|---|
| | Per cent | Per cent | Per cent | | Per cent |
| Standard emulsion | 0.0 | 0.05 | 0.5 | 1¾ | 5.0 |
| I | 0.2 | 0.05 | 0.5 | 5½ | 30.0 |
| II | 0.2 | 0.025 | 0.5 | 3 | 70.0 |
| III | 0.2 | 0.025 | 0.25 | 2¾ | 80.0 |
| IV | 0.2 | 0.0 | 0.5 | 2 | 100.0 |
| V | 0.2 | 0.0 | 0.25 | 1 | 100.0 |

From this it will be seen that the addition of the sodium aluminate to the standard emulsion increased the resistance to breakdown considerably, whilst the elimination of the alkali reduced the resistance to practically the same as that of the standard emulsion without the sodium aluminate, and the reduction of the amount of soap added produced a still further reduction in the resistance to breakdown, whilst at the same time, the percentage of sand covered by the bitumen was increased considerably thus showing that the emulsions prepared in this manner have the unexpected additional advantage of increased covering power after breaking.

The same series of emulsions were then tested for the adhesion of the bitumen by the method described above and employed in Examples 1–8.

Using the standard emulsion prepared as described above and Mountsorrel granite chippings as the stones, the following results were obtained:

| Time of curing | Dry stones | | Wet stones | |
|---|---|---|---|---|
| | 4 hrs. | 24 hrs. | 4 hrs. | 24 hrs. |
| Minutes shaking to 50% removal | 0.2 | 0.8 | 0.1 | 0.7 |

The following results were obtained using emulsions I, III, IV and V described above:

| Time of curing | Dry stones | | Wet stones | |
|---|---|---|---|---|
| | 4 hrs. | 24 hrs. | 4 hrs. | 24 hrs. |
| I. 0.05% NaOH, 0.5% S. L. R. soap, 0.2% sodium aluminate (NaAlO₂) | | | | |
| Minutes shaking to 50% removal | 20 | 60 | 30 | 90 |
| Relative improvement in adhesion over standard emulsion | 100 | 75 | 300 | 130 |
| III. 0.025% NaOH, 0.25% S. L. R. soap, 0.2% sodium aluminate | | | | |
| Minutes shaking to 50% removal | 45 | 83 | 45 | 98 |
| Relative improvement in adhesion over standard emulsion | 225 | 100 | 450 | 140 |
| IV. Nil percent NaOH, 0.5% S. L. R. soap, 0.2% sodium aluminate | | | | |
| Minutes shaking to 50% removal | 60 | 135 | 60 | 135 |
| Relative improvement in adhesion over standard emulsion | 300 | 170 | 600 | 190 |
| V. 0.0% NaOH, 0.25% S. L. R. soap, 0.2% sodium aluminate | | | | |
| Minutes shaking to 50% removal | 120 | 150 | 120 | 150 |
| Relative improvement in adhesion over standard emulsion | 600 | 190 | 1200 | 210 |

These results show that the reduction in the amount of alkali and/or stabilizer used in preparing the emulsion also produces further improvement in the adhesion of the bitumen to the stone surfaces.

Example 10

A similar series of emulsions to those described in Example 9 was prepared containing varying amounts of free alkali and stabilizer and varying amounts of stannous chloride added to the aqueous phase.

The emulsions were then tested for resistance to breakdown as described in Example 9 with the following results:

| Emulsion | Amount of stannous chloride | Amount of free alkali | Amount of soap (S. L. R.) | Breakdown time in minutes | Sand covered |
|---|---|---|---|---|---|
|  | Per cent | Per cent | Per cent |  | Per cent |
| VI | 0.10 | 0.05 | 0.5 | 2 | 10 |
| VII | 0.10 | 0.02 | 0.5 | 1¼ | 10 |
| VIII | 0.10 | Nil | 0.5 | ½ | 20 |
| IX | 0.15 | 0.05 | 0.5 | 4½ | 15 |
| X | 0.15 | 0.01 | 0.5 | 1 | 10 |
| XI | 0.15 | Nil | 0.5 | 1¼ | 10 |
| XII | 0.20 | 0.05 | 0.5 | 9 | 30 |
| XIII | 0.20 | Nil | 0.5 | 1 | 10 |

Some of these emulsions were also tested for adhesion of the bitumen coating by the methods described above and the following results were obtained.

| Time of curing | Dry stones | | Wet stones | |
|---|---|---|---|---|
|  | 4 hrs. | 24 hrs. | 4 hrs. | 24 hrs. |
| VI. 0.05% NaOH, 0.5% S. L. R. soap, 0.10% SnCl₂.2H₂O |  |  |  |  |
| Minutes shaking to 50% removal | 1 | 15 | 1 | 17.5 |
| Relative improvement in adhesion over standard emulsion | 5 | 19 | 10 | 25 |
| VII. 0.02% NaOH, 0.5% S. L. R. soap, 0.10% SnCl₂.2H₂O |  |  |  |  |
| Minutes shaking to 50% removal | 0.6 | 20 | 0.6 | 20 |
| Relative improvement in adhesion over standard emulsion | 3 | 25 | 6 | 29 |
| IX. 0.05% NaOH, 0.5% S. L. R. soap, 0.15% SnCl₂.2H₂O |  |  |  |  |
| Minutes shaking to 50% removal | 0.8 | 20 | 1 | 20 |
| Relative improvement in adhesion over standard emulsion | 4 | 25 | 10 | 29 |
| XI. Nil% NaOH, 0.5% S. L. R. soap, 0.15% SnCl₂.2H₂O |  |  |  |  |
| Minutes shaking to 50% removal | 0.8 | 24 | 0.9 | 20 |
| Relative improvement in adhesion over standard emulsion | 4 | 30 | 9 | 29 |
| XII. 0.05% NaOH, 0.5% S. L. R. soap, 0.20% SnCl₂.2H₂O |  |  |  |  |
| Minutes shaking to 50% removal | 0.4 | 6 | 0.4 | 7 |
| Relative improvement in adhesion over standard emulsion | 2 | 8 | 4 | 10 |
| XIII. Nil % NaOH, 0.5% S. L. R. soap, 0.20% SnCl₂.2H₂O |  |  |  |  |
| Minutes shaking to 50% removal | 0.4 | 20 | 0.6 | 22 |
| Relative improvement in adhesion over standard emulsion | 2 | 25 | 6 | 31 |

The above results show that the increase in the resistance of the emulsion to breakdown in use produced by the addition of stannous chloride is reduced by the reduction of the alkali but that the covering power of the emulsion after breaking is not increased; and also reduction of the amount of alkali employed in preparing the emulsions, further increases the adhesion of the bitumen to the stones to which it is applied in use though not to such an extent as with sodium aluminate.

Example 11

A similar series of emulsions to those described in Examples 9 and 10 were prepared containing varying quantities of alkali and soap and sodium stannate (Na₂SnO₃.3H₂O) added to the aqueous phase before emulsifying.

This series of emulsions was again tested for resistance to breakdown and covering power by the method described in Example 9 and the following results were obtained:

| Emulsion | Amount of sodium stannate | Amount of alkali | Amount of soap (S. L. R.) | Breakdown time in minutes | Sand covered |
|---|---|---|---|---|---|
|  | Per cent | Per cent | Per cent |  | Per cent |
| XIV | 0.2 | 0.05 | 0.5 | 6½ | 10 |
| XV | 0.2 | 0.005 | 0.5 | 1¾ | 10 |
| XVI | 0.2 | Nil | 0.5 | ¾ | 15 |
| XVII | 0.3 | 0.05 | 0.5 | 7½ | 10 |
| XVIII | 0.3 | Nil | 0.4 | 2 | 20 |

These results show that the addition of sodium stannate increases the resistance to breakdown and the reduction in the amount of alkali added reduces such resistance, and that there is a small but not very marked increase in the covering power of the emulsion after breaking.

Emulsions XIV and XV of the above series were also tested for adhesion of the bitumen coating by the method previously described with the following results:

| Time of curing | Dry stones | | Wet stones | |
|---|---|---|---|---|
|  | 4 hrs. | 24 hrs. | 4 hrs. | 24 hrs. |
| XIV. 0.05% NaOH, 0.5% S.L.R. soap, 0.2% sodium stannate (Na₂SnO₃.3H₂O) |  |  |  |  |
| Minutes shaking to 50% removal | 0.6 | 9 | 0.4 | 10 |
| Relative improvement in adhesion over standard emulsion | 3 | 11 | 4 | 14 |
| XV. 0.005% NaOH, 0.5% S. L. R. soap, 0.2% sodium stannate |  |  |  |  |
| Minutes shaking to 50% removal | 0.4 | 10 | 0.4 | 10 |
| Relative improvement in adhesion over standard emulsion | 2 | 13 | 4 | 14 |

The above results clearly show an improvement in the adhesion of the bitumen coating by adding sodium stannate to the emulsions, but that unlike the emulsions prepared with sodium aluminate according to Example 9, there is no marked improvement in adhesion by reducing the amount of alkali and/or stabilizer.

Example 12

A further series of emulsions was prepared containing varying quantities of alkali and soap added to the aqueous phase and an addition of 2.0% of aluminium oleate added to the bituminous phase before emulsification.

These emulsions were tested by the method described in Example 9 for resistance to breakdown and covering power after breaking and the following results were obtained:

| Emulsion | Amount of aluminium oleate | Amount of alkali | Amount of soap (S. L. R.) | Breakdown time in minutes | Sand covered |
|---|---|---|---|---|---|
|  | Per cent | Per cent | Per cent |  | Per cent |
| XIX | 2.0 | 0.05 | 0.5 | 2½ | 10 |
| XX | 2.0 | 0.02 | 0.5 | 1½ | Nil |
| XXI | 2.0 | 0.02 | 0.4 | 1 | 10 |

These show that in the case of the addition of aluminium oleate to the bituminous phase of the emulsion, the reduction in the amount of alkali also reduces the resistance to breakdown although the increase in resistance to breakdown produced by the addition of the aluminium oleate is not as great as with some of the other compounds. They also show that the covering power of the emulsion after breaking is not increased.

It will thus be seen that the preparation of the bitumen or tar emulsions according to the present invention produces a considerable increase in the adhesion of the bitumen or tar to the stone, and considerably increases its resistance to weathering, with satisfactory maintenance of the other important properties of the emulsion, such as resistance to breakdown, stability in storage or ease of emulsification.

Similar experiments have also been carried out using other aggregates, such as flint, quartzite, Criggion granite, and limestone.

In each case improvements in the adhesion of the bitumen were obtained; but in general, it was found that where the adhesion of the bitumen from the standard emulsion to the aggregate was initially relatively poor, the improvement was greater than that obtained by the addition of these same components to an emulsion of bitumen used to coat an aggregate where the adhesion was initially relatively greater.

In the above results, the figures for the 4 hours' "cure" are considered of more importance than those for the 24 hours' "cure," owing to the fact that the adhesion of the bitumen to the stone is more important in the earlier stages after application, as weather conditions may be the deciding factor in securing satisfactory results in practice.

Further, since the laboratory tests are carried out under conditions of high humidity and absence of air currents, which conditions tend to delay breaking of the emulsion, it is considered that the 4 hours' "cure" corresponds to a shorter period of time in actual practice.

The tests made with wet stones are indicative of results which would be obtained in practice, either with wet aggregate or when the emulsion is applied shortly after rain.

The emulsions used in the examples above described were prepared from an ordinary commercial asphalt produced from Venezuelan crude petroleum and the figures given only relate to asphalts of this type, and slight modifications have been found necessary for asphalts from other sources.

The results indicate that satisfactory adhesion would be obtained with emulsions prepared according to the invention shortly after spreading on the road surface, as in surface dressing, which could thus be carried out satisfactorily under adverse weather conditions.

I claim:

1. A method of producing a stable bituminous emulsion of the oil-in-water type that readily forms a bituminous surface coating when applied to a mineral aggregate which comprises emulsifying bitumen with an aqueous solution containing 0.25 to 0.5% of water-soluble soap and 0.1% to 0.2% of alkali metallate selected from the group consisting of aluminum, tin, zinc, chromium, boron, molybdenum and vanadium, and caustic alkali wherein the excess amount of caustic alkali is less than 0.02% by weight of the finished emulsion to effect shortening of the time before breakdown.

2. A method of producing a stable bituminous emulsion of the oil-in-water type that readily forms a bituminous surface coating when applied to a mineral aggregate which comprises emulsifying 55% by weight of a bitumen based on the finished emulsion with an aqueous solution containing 0.5% of rosin soap, 0.2% of sodium aluminate and 0.02% of free caustic soda.

3. A method of producing a stable bituminous emulsion of the oil-in-water type that readily forms a bituminous surface coating when applied to a mineral aggregate which comprises emulsifying 55% by weight of a bitumen based on the finished emulsion with an aqueous solution containing 0.5% sodium rosin soap and 0.2% of sodium aluminate.

4. A method of producing a stable bituminous emulsion of the oil-in-water type that readily forms a bituminous surface coating when applied to a mineral aggregate which comprises emulsifying 55% by weight of a bitumen based on the finished emulsion, which bitumen is heated above its liquefying temperature with an aqueous solution containing 0.5% of a water-soluble soap and 0.2% of sodium aluminate and less than 0.02% of free caustic soda to effect shortening of the time before breakdown.

HAROLD GEORGE WILLIAMS.